United States Patent [19]

Kaye et al.

[11] 4,233,269
[45] Nov. 11, 1980

[54] GAS LIQUID DISTRIBUTOR

[75] Inventors: Larry A. Kaye, Stanhope; Robert M. Koros, Westfield, both of N.J.

[73] Assignee: Exxon Research & Engineering Co., Florham Park, N.J.

[21] Appl. No.: 959,306

[22] Filed: Nov. 9, 1978

Related U.S. Application Data

[63] Continuation of Ser. No. 777,028, Mar. 14, 1977, abandoned.

[51] Int. Cl.³ .......................... B01F 3/08; B01J 12/00; B01J 14/00
[52] U.S. Cl. ............................... 422/207; 261/114 A; 261/124; 261/114 R; 422/194; 422/195; 422/220; 422/224
[58] Field of Search ............... 422/194, 195, 207, 220, 422/224; 261/114 R, 114 A, 124; 208/146; 239/504, 553, 533.5, 559, 590.5

[56] References Cited

U.S. PATENT DOCUMENTS

| | | | |
|---|---|---|---|
| 1,598,996 | 9/1926 | Wheelock | 239/559 X |
| 3,363,843 | 1/1968 | Ballard et al. | 239/504 |
| 3,427,007 | 2/1969 | Braun | 202/158 X |
| 3,495,952 | 2/1970 | Ulbrecht et al. | 422/194 |
| 3,541,000 | 11/1970 | Hanson et al. | 208/108 |
| 3,598,542 | 11/1971 | Carson et al. | 422/195 X |
| 3,652,451 | 3/1972 | Boyd | 208/146 |
| 3,785,779 | 1/1974 | Li et al. | 261/124 |
| 3,824,080 | 7/1974 | Smith et al. | 422/191 |
| 3,944,394 | 3/1976 | McClintock et al. | 208/146 |
| 3,990,857 | 11/1976 | Vandenhoeck | 422/195 X |

Primary Examiner—Michael S. Marcus
Attorney, Agent, or Firm—F. Donald Paris

[57] ABSTRACT

A fluid flow distributor for mixing and distributing gas and liquid over the cross-section of the reactor vessel having an upward fluid flow path. The distributor comprises an inlet pipe for directing quench liquid into and through an inlet feed conduit connected with the reactor and an elliptically-shaped cover plate disposed above the outlet of said conduit, against which the flow from the conduit is directed. A relatively uniform distribution of the gas and liquid to the vessel is obtained by means of the plurality of apertures provided in the plate and the double reflection of the flow from the cover plate and the bottom of the vessel. The inlet conduit includes a plurality of baffles and orifices which aid in the thorough mixing of the quench liquid and the primary or main gas-liquid flow.

14 Claims, 7 Drawing Figures

GAS LIQUID DISTRIBUTOR

This is a continuation of application Ser. No. 777,028, filed Mar. 14, 1977 now abandoned.

BACKGROUND OF THE INVENTION

In various industrial operations, reactor vessels are employed wherein gases and liquids must be contacted in order for a desired chemical reaction to proceed. Typical of these operations are hydrofining of oils, hydrocracking of the hydrocarbons into lighter compounds, hydrogenation of olefins and aromatics and oxonation of olefins to aldehydes. For the best results to be achieved in the reactor it is essential that the gas and liquid mix thoroughly, be distributed evenly over the cross-section of the reactor, and effect good axial mixing of the contents. Maintaining a well and thoroughly mixed condition is difficult because gases and liquids can separate unless they are traveling at the necessary speed such that they mix inherently. In commercial reactors, especially of the upflow variety where a relatively long residence time normally is required, the flow rates are such that separation of gas and liquid is quite significant. In certain instances, packing the vessels with inert materials is used to provide for the necessary mixing and to avoid separation of the gas and liquid. However, in spite of this, the chemical reactions often are not as uniform as may be desired.

In a number of processes which employ reactor vessels, there is a relatively large hold-up time for the gas and liquid which tends to cause them to separate. However, such hold-up time is often necessary to facilitate completion of the reaction. In this type of reactor, typically no packing of the catalyst bed is employed and the performance and operation of the distributor is particularly important. Prior art devices which have been employed in unpacked reactor vessels in order to mix and evenly distribute entering gas and liquid streams over substantially the entire cross-section of the vessel have included several different types of distributors or spargers. In a particular design the gas and liquid are mixed in a feed pipe or central header and then distributed through small holes in attached rings or lateral piping. The details of a typical distributor of this type can be found in U.S. Pat. No. 3,785,779. While this distributor is effective, it has certain disadvantages which include a substantial pressure drop in areas where the quench and main fluids are mixed and distributed and the holes in the sparger are easily plugged by suspended solids. Another problem is that stagnant regions can develop beneath or alongside the rings or the lateral pipes, that is, areas where substantially no flow occurs while gas and liquid collect. Another type of distributor which has been frequently used is where the gas and liquid are mixed in a so-called "quench" box. The fluids are distributed to the column or reactor after being deflected through a box which essentially comprises a small enclosed volume with few inlets and outlets in which fluid streams are mixed. While the latter design is less subject to fouling and requires relatively less pressure drop, the mixing and evenness of the gas liquid distribution is much poorer than the previously described distributor or that of the present invention. Also, the operation of the "quench" box is substantially affected by improper installation which may include tilting of the box or unsymmetrical flow into the box. Other distributors employed have included bubble caps for distributing the fluids; however, they require a relatively large pressure drop and do not properly mix the liquid and gas streams.

SUMMARY OF THE INVENTION

The present invention overcomes the deficiencies and disadvantages of the prior art devices by providing an improved distributor for use in the mixing and even distribution of fluids in a reactor vessel having an upward fluid flow path. The present invention is designed to have a relatively low pressure drop while still being capable of mixing and distributing gas and liquid uniformly over substantially the entire cross-section of a reactor vessel in which the fluid flows upward. This design is particularly useful in systems where normally suspended solids plug the distributor. The distributor can distribute and mix the fluids either at the inlet of the reactor vessel or between the reactor beds. Basically, a distributor constructed according to the present invention comprises an inlet feed conduit which is secured to the reactor and contains a plurality of spaced baffles along its length for thoroughly mixing the quench liquid and gas-liquid flow received therein. The outlet flow from the feed conduit is directed against a cover plate, preferably elliptical in shape, having a plurality of symmetrically arranged openings. The exiting gas and liquid are distributed to the downstream reactor by flowing around the cover plate and through the various openings which are sized to create a relatively low pressure drop. The shape of the cover makes the distribution in the reactor less sensitive to installation mishaps or errors. In an alternate embodiment the entrance or feed conduit can include a mixing "Tee" or nozzle for adding liquid or gas to the inlet flow when desired. In a further embodiment, the circulation of the gas in the center of the reactor can be enhanced by providing a further elliptical baffle cover plate above and downstream of the aforementioned cover plate and providing a central opening in the latter. Still yet a further modification includes providing a conically-shaped distributor plate with its apex end directly above the feed conduit outlet, for providing the desired gas-liquid flow distribution, with the further possible modification being the addition of an upstream conically-shaped second baffle plate smaller in size than the primary one.

DESCRIPTION OF THE PREFERRED EMBODIMENTS

Figure 1:
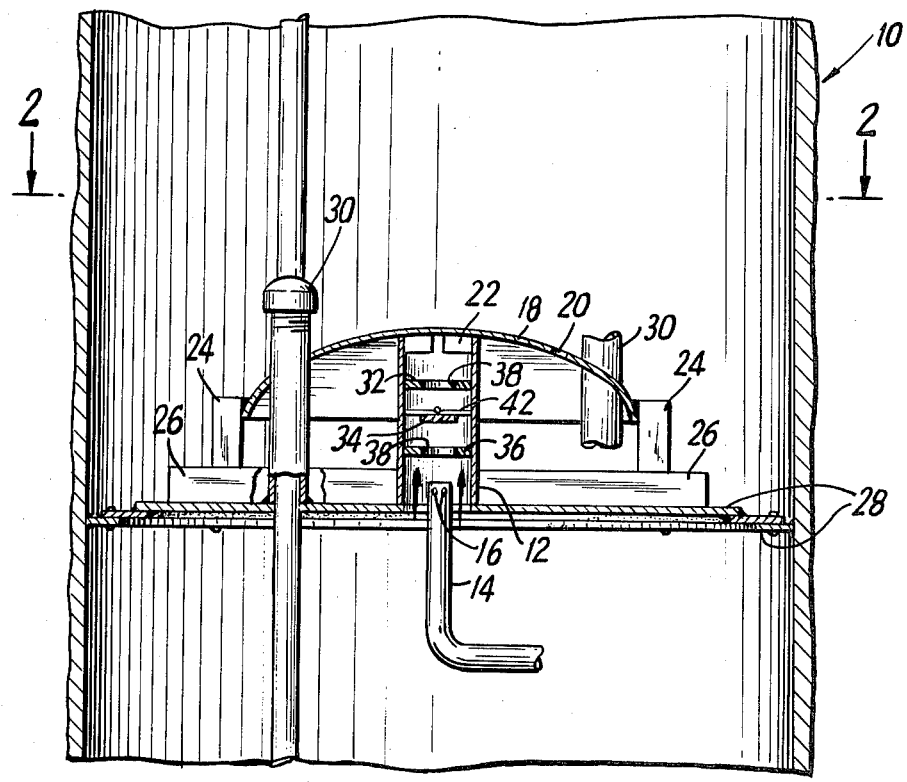
FIG. 1 illustrates a vertical cross-sectional view of a portion of a typical reactor vessel which contains a distributor according to the present invention, taken substantially along the line 1-1 of FIG. 2.

Referring now to the drawings, wherein like parts are designated by the same reference numerals throughout the several views, there is shown in FIG. 1 a reactor vessel 10 having an inlet feed conduit 12 which may be conventionally secured either at the bottom of the reactor into which the gas and flowing liquid are introduced as described in further detail hereinafter, or to a deck disposed between the reactor beds in the vessel. A quench inlet pipe 14 having exit openings or nozzles 16 from which quench liquid emanates is disposed centrally within the inlet feed conduit 12 in substantial alignment with the axis thereof. A dish-shaped concave elliptical cover plate 18 is located downstream of and above the outlet end of the feed conduit. The concave side faces the conduit outlet (i.e. upstream) and includes a plurality of openings 20 which extend through the plate. The openings are spaced radially from the center of the plate in a circumferentially spaced array. The number and spacing of the openings can vary with the particular process. The exit or outlet end of the feed conduit is in abutting contact, in the preferred embodiment, with the underside of the cover plate; however, it is not firmly affixed to it. The pair of intersecting members 22 centrally located on the underside fractionally fit within the outlet of the feed conduit. As shown in FIG. 1, the plate 18 is fixedly secured in place at its periphery by support bars 24 welded to the periphery at spaced locations about the plate. These bars in turn are supported by radially extending bar members 26 which are supported by means of being welded to support rings 28 which in turn are secured to the reactor vessel wall. Also, extending upstream through the cover plate are standard thermowell guides 30 the purpose of which is to guide and protect thermocouples which are used to measure and control the reactor temperature. Also, these guides 30 are used for internal piping of quench fluid. Disposed within the inlet feed conduit 12 between the quench liquid inlet 14 and the opposite or outlet end of the conduit are a plurality of axially spaced baffle members 32, 34, 36. The pair of annular baffles 32, 36 have central openings 38 and are located on either side of a centrally-located circular baffle plate 34 which is supported, for example, by cross-shaped rod members 42 that are secured to the wall (e.g., by welding) of the inlet feed conduit and at their intersection support (e.g., also by welding) the baffle plate.

In operation, the flow of gas and liquid enter the inlet conduit 12, as shown by the arrows, where it mixes with quench liquid jets emanating from the outlet nozzle openings 16 in the quench inlet pipe 14. These openings 16 are sized to provide good distribution of the quench fluid about the inlet conduit. A preferred size is $\frac{1}{4}$" to $\frac{1}{2}$" in diameter. The size of the inlet conduit itself, i.e. its radius and length, is such as to provide for turbulent bubbly flow between the quench liquid and the flow of gas and liquid which enters the inlet in surrounding or coaxial relation to the quench liquid. Thorough mixing of the quench liquid and the main gas-liquid flow is accomplished by means of the aforementioned annular orifice baffles and central baffle plate within the conduit, which cause comingling of the flows.

The mixed flow exiting from the feed conduit is directed against the concave underside of the cover plate whereupon the gas and liquid are distributed to the downstream portion of the vessel by flowing around the cover plate and also through the various openings provided in the plate. These openings preferably are symmetrically positioned on the plate at a radii of approximately one-half of the plate radius. This radius is such that gas flows up in the center portion of the reactor and may vary from $\frac{1}{3}$ to $\frac{2}{3}$ of the plate radius. The holes are sized, preferably 1" in diameter, so that very little pressure drop occurs across them. It is also preferred to form the holes, for example, by drilling them normal to the surface of the plate so that the flow is directed in a slightly outward direction and will actually diverge in a downstream fan-shaped manner. By providing the cover with an elliptical configuration as described heretofore, gas and liquid distribution within the vessel is less sensitive to tilting or misalignment of the plate or the inlet conduit when mounting it within the reactor vessel. Thus, if the cover is accidentally installed in a slightly tilted relationship, the fan-shaped effect of the exhausting mixed liquid and gas will still occur and give the desired distribution across the cross-section of the vessel. The cover plate generally extends in a direction which is transverse to the upward flow of the gas and liquid.

The aforedescribed distributor is particularly useful in upflow gas liquid reactor where no packing or catalyst bed is employed and where only reactor holdup volume is used to facilitate completion of the reaction. However, there are instances where it could be employed in connection with a reactor having a packing or catalyst. In the former type of reactor, the performance of the distributor is especially important. In introducing the fluid into the reactor vessel, it is highly desirable that a generally even velocity profile without mal-distribution or stagnation points result, in order to obtain a uniform reaction within the reactor vessel. The spreading out or enlargement of the relatively high velocity fluid stream into a uniform velocity gradient across the substantially increased diameter of the vessel relative to the inlet conduit is accomplished by the flow distributor of the present invention.

The cover plate is preferably elliptical with a 2 to 1 major to minor axis. The major axis is preferably $\frac{2}{3}$ of the column diameter and may vary from $\frac{1}{2}$ to $\frac{3}{4}$ of the column diameter. By employing a distributor according to the present invention, the pressure drop for distributing the fluid is substantially reduced by virtue of the conduit size and open flow area above the conduit. Plugging by suspended solids is avoided by virtue of using maximum open area in the conduit and providing high shearing forces by virtue of the baffles and the stagnant regions are avoided for reasons discussed above.

Figure 2:
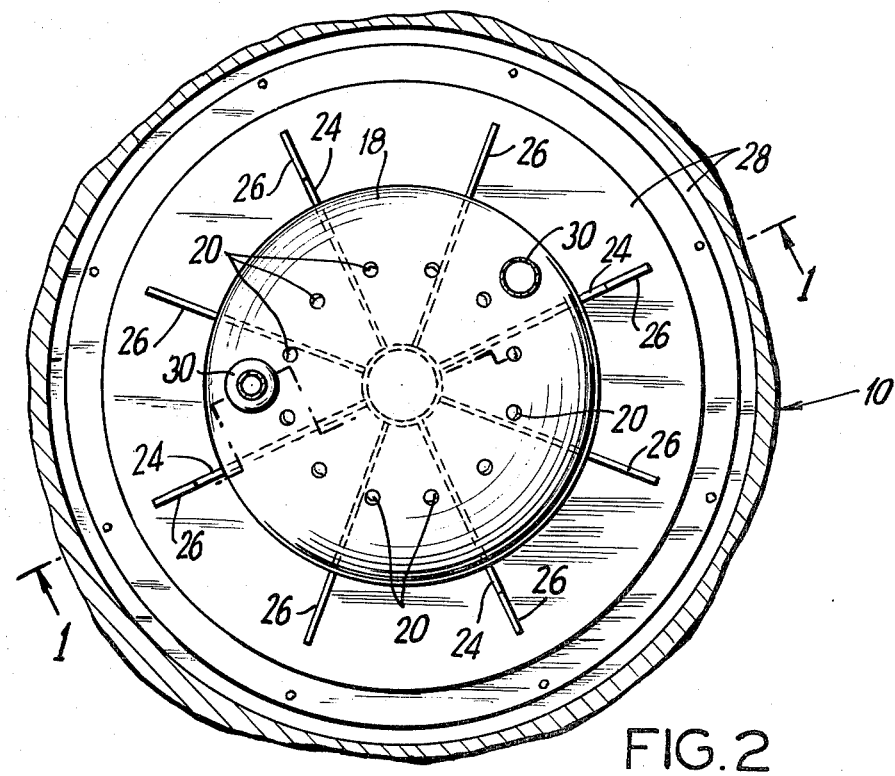
FIG. 2 illustrates a horizontal cross-sectional view of the installed distributor taken substantially along the line 2-2 of FIG. 1.
Figure 3:
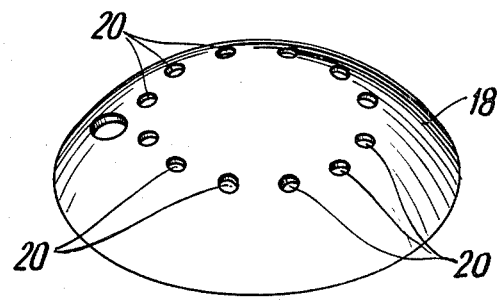
FIG. 3 is a perspective view of a cover plate of FIGS. 1 and 2 according to the invention.
Figure 4:
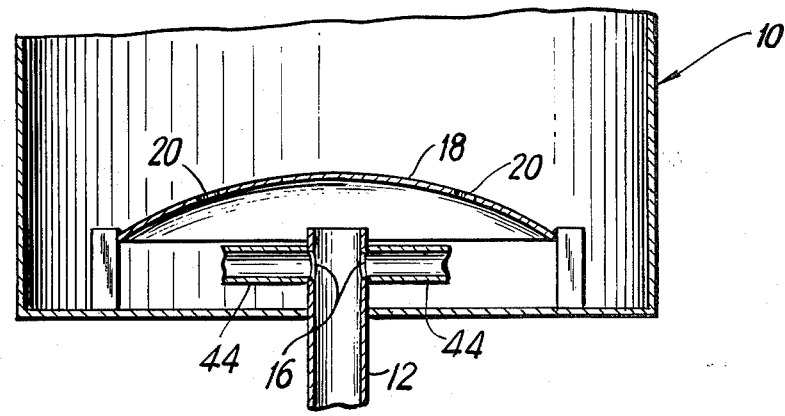
FIG. 4 illustrates a vertical cross-sectional view of another embodiment of the distributor including a different type of mixing means in the inlet feed conduit.

Turning now to FIG. 4, there is shown an alternate embodiment which has basically the same characteristics as the preferred embodiment as FIGS. 1 and 2. However, according to this design, there is provided an inlet feed conduit 12 which, instead of having internal baffles within the flow path like the preferred embodiment, is provided with a mixing "Tee" in the form of a conduit disposed at a right angle, i.e., transverse to the direction of flow through the inlet. One or more "Tees" 44 may be provided depending upon the degree of mixing desired. As shown in FIG. 4, flow is upward through the feed conduit as in the preferred embodiment. The pressure drop and velocity is maintained in the conduit to maintain gas bubbles well dispersed within the liquid. The mixing "Tees" or nozzles 44 are connected with the feed conduit for the addition of liquid or gas, for example, a cooling liquid for exothermic reactions, transverse or at right angles with respect to the fluid flow. As with the preferred embodiment, flow passes through the inlet feed conduit and the exiting gas-liquid mixture impacts on the underside of the cover plate. In this embodiment the exit end of the feed terminates at a distance below the cover plate, for example, three inches, in order to permit proper turning of the flows, high impact velocities on the plate, and minimum pressure drop. The fluid exiting from the feed is distributed by flowing around the bottom of the cover plate and through the plurality of holes which are formed in the plate.

Figure 5:
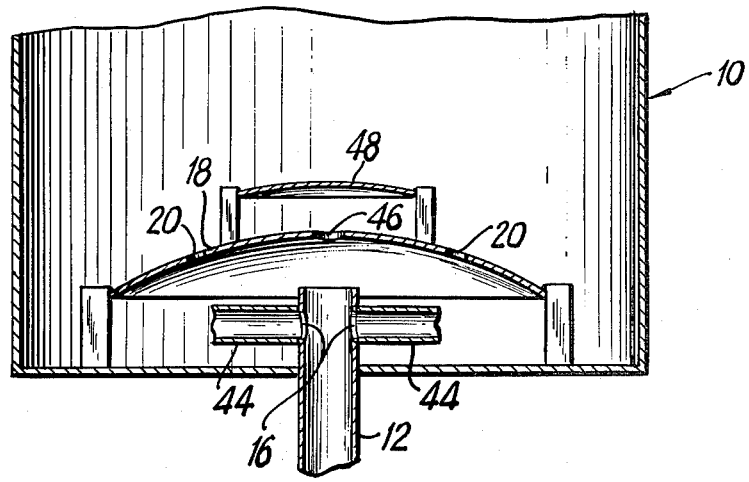
FIG. 5 illustrates a further modification of the embodiment of FIG. 4.

The embodiment of FIG. 5, which is a modification of FIG. 4, includes a central opening 46 in the cover plate which may be approximately one-half the diameter of the feed conduit. At a location approximately two inches directly above the primary or main cover plate, there is provided a further but smaller elliptical baffle plate 48 which is located above the opening 48. Its major axis is approximately one-sixth the vessel diameter and is symmetrically disposed with respect to the reactor vessel axis. The additional central opening and secondary baffle increases the gas circulation in the center of the vessel and prevents gas pockets from forming beneath the main plate by permitting the gas to flow through the central opening. The secondary plate can be supported from the wall or base of the reactor vessel in a conventional manner.

Figure 6:
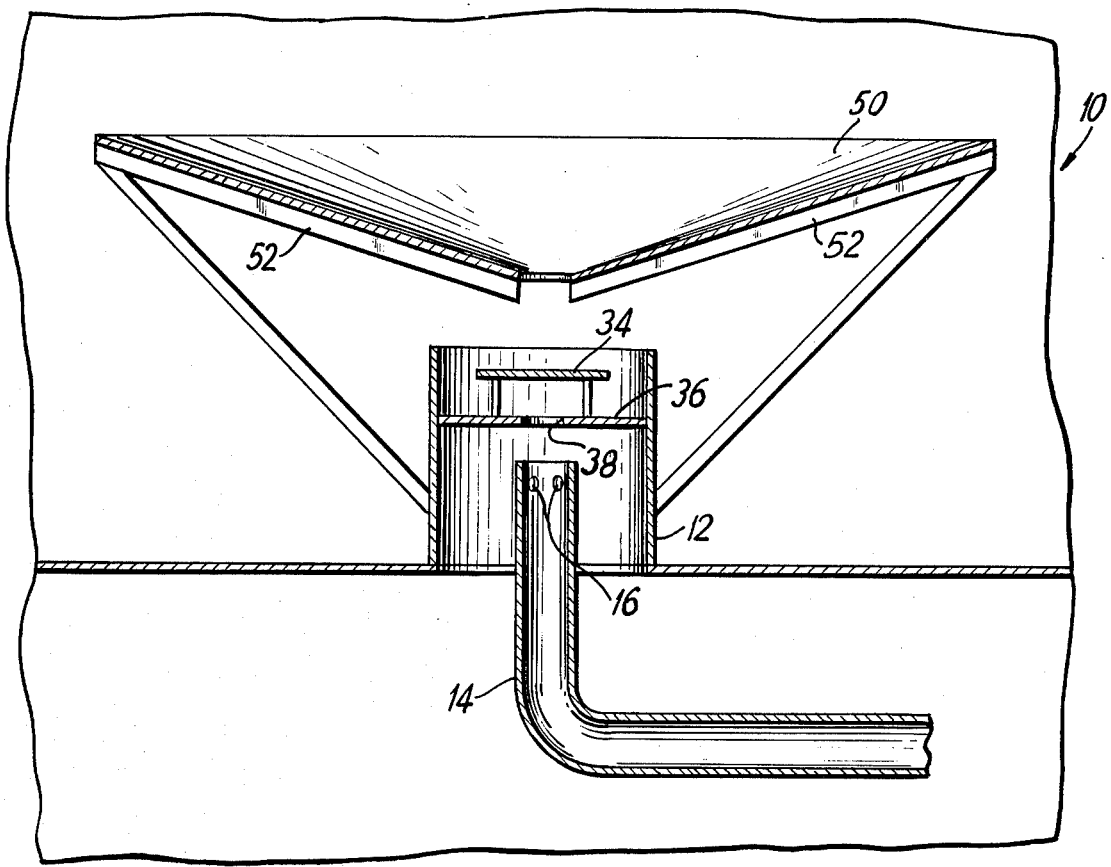
FIG. 6 is a vertical cross-sectional view of still yet a further embodiment of the present invention including conical distributor.
Figure 7:
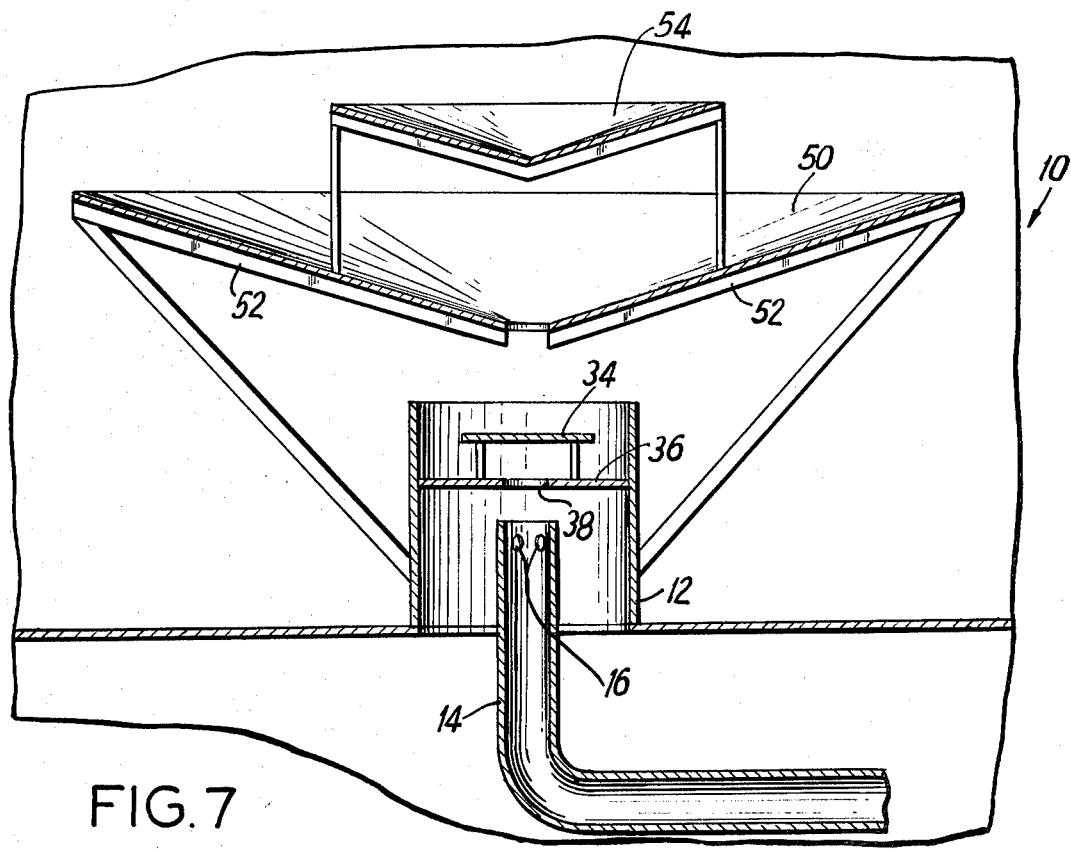
FIG. 7 is a modification of the conical distributor of FIG. 6.

Turning to another embodiment, FIGS. 6 and 7 illustrate different versions of the distributor device of the preferred embodiment, which has particular use in a bubble column reactor (in which the other embodiments also find utility). The basic distributor includes the inlet conduit 12; however, there is provided a conically-shaped distributor plate 50 having a plurality of radial ribs 52 on the underside (upstream side) thereof and having its substantially concave side facing downstream of the reactor vessel in the direction of the fluid flow. The flow of gas and liquid enters, for example, from a bed which typically is below the feed conduit, where it mixes with the quench liquid jets which emanate from the nozzle openings. The mixing zone takes place in the portion of the inlet conduit above or upstream of the quench inlet, which includes the annular baffle and central baffle plate for insuring mixing of the process fluids with the quench fluid. The openings 16 in the nozzle are sized to provide good distribution of the quench fluid into the inlet feed conduit and the pipe is sized to provide turbulent bubbly flow, as discussed heretofore, which also is aided by the presence of the baffles. Flow from the exit end of the inlet feed conduit is downstream toward the central opening and the conical distributor plate. A portion of the flow is directed along the lower or upstream side of the plate to its periphery and then, from the central opening and the periphery of the plate into the upper bed. The radial or transverse extending ribs or corrugations 52 guide the flow from the plate center to its periphery and prevent maldistribution due to tilting of the plate during installation or otherwise. Conventional supports can be provided to maintain the distributor plate in place within the vessel.

The alternate design of FIG. 7, which provides for improved distribution, is accomplished by providing a second but smaller conical distributor plate 54 similar to the primary plate only not having a central opening but being provided with ribs or corrugations. The bubbly gas and liquid flow is distributed from the periphery of the main plate and also from the secondary plate.

There has thus been shown a distributor having various alternate designs, which provide for trouble-free and effective use of the reactor volume, excellent contacting of the gas and liquid throughout the reaction zone and moreover, adequate quenching of the exothermic reaction to maintain reaction stability and requisite reaction temperatures. While a specific embodiment of the invention and certain modifications have been shown and described in detail to illustrate the application of the inventive principles, it will be understood that the invention may be embodied otherwise without departing from such principles. Various modifications to the invention will be apparent to those skilled in the art without departing from the scope of the invention to which reference is made in the claims.

What is claimed is:

1. In an upward flow reactor chamber having a chamber wall and an inlet feed conduit located therein which is substantially smaller in its cross-section than the corresponding cross-section defined by said chamber wall and has inlet and upper outlet ends, said inlet end of said inlet conduit receiving an upward directed fluid stream, flow distributor means situated adjacent and downstream of and above said inlet conduit for directing flow in a general direction from said outlet end of said inlet conduit upward into said chamber, wherein the improvement comprises:

quench inlet means extending through said chamber wall and operably associated with said inlet conduit for injecting a quench liquid stream directly into said inlet conduit for upward flow in the same direction as said fluid stream wherein said fluid and quench liquid streams received by said inlet conduit are mixed, horizontal support means extending transversely across the entire cross-section of said chamber and having a single inlet feed opening in which said inlet feed conduit is located, said flow distributor means located downstream of and above proximate the outlet end of said inlet conduit for receiving said fluid and quench liquid streams and including at least a main member having a periphery and bottom surface facing said outlet end of said inlet conduit, said inlet conduit supported so that said outlet end is disposed at least directly adjacent to said bottom surface for directing said upward flow of said fluid and quench liquid streams from said outlet end thereof against said bottom surface of said flow distributor means, said bottom surface constructed and arranged for cooperation with said upward flow of said streams for directing at least a part of said upward flow around the periphery of said main member into a relatively open flow area within said chamber above said main member, means for supporting said flow distributor means including at least said main member in said chamber in transverse fixed relation relative to said chamber wall, said main member extending transversely for a substantial portion of the cross-section of said chamber and having a greater transverse cross-section than the corresponding cross-section of said outlet end of said inlet conduit, said flow distributor means aiding in the distribution of fluid uniformly over the transverse cross-section of said chamber.

2. In the chamber of claim 1 including mixing means comprising a plurality of baffles within said inlet feed conduit downstream of and above the area of injection of said quench liquid stream for mixing said quench stream with said fluid stream.

3. In the chamber of claim 2 wherein said plurality of baffles comprises first and second baffles disposed downstream and above said quench inlet means which is situated within said inlet conduit, said second baffle located centrally of said inlet feed conduit.

4. In the chamber of claim 1 including mixing means which comprises a plurality of axially spaced baffles situated within said inlet feed conduit and further including said quench inlet means disposed in said conduit, wherein said baffles are situated downstream from and above said quench inlet means, said plurality of baffles comprising a first annular baffle having a central aperture, a second annular baffle having a central aperture, and a baffle plate disposed in substantial axial alignment with said central apertures of said first and second baffles and between said first and second annular baffles.

5. In the chamber of claim 1 wherein said distributor means comprises an elliptical plate having spaced apertures.

6. In the chamber of claim 5 wherein said plate has major to minor axis ratio of about 2 to 1.

7. In the chamber of claim 5 wherein said plate has a major axis which is in the range of from about ½ to about ¾ of the diameter of said chamber which contains said plate.

8. In the chamber of claim 1 wherein said main member comprises the only flow distributor means in the plane substantially containing said main member in said chamber.

9. In an upward flow reactor chamber having a chamber wall and an inlet feed conduit including an outlet end, which is substantially smaller in cross-section than the cross-section of said chamber transverse to the direction of flow, and flow distributor means situated downstream from and adjacent said inlet conduit for directing fluid flow from said inlet conduit upward into said chamber, wherein the improvement comprises:
 means operably associated with said inlet conduit for aiding in the mixing of fluid streams received by said inlet conduit, said flow distributor means located downstream of and proximate said outlet end of said inlet conduit means for receiving upward flow from said inlet conduit, means for supporting said flow distributor means in said chamber transverse of the direction of fluid flow from said inlet conduit for a predetermined distance relative to the width of said chamber, said flow distributor means comprising a substantially curved primary disk-shaped member including a central opening and having a plurality of apertures therethrough symmetrically arranged with respect to the axis of said member, and including a concave side facing flow from said inlet feed conduit, said flow distributor means further including a second non-apertured disk-shaped member situated upstream of said primary member having a concave side facing said inlet feed conduit and wherein said second member is smaller in size than said primary member, whereby said flow distributor means aids in the distribution of fluid uniformly over the cross-section of said chamber.

10. In an upward flow reactor chamber having a chamber wall and an inlet feed conduit including an oulet end, which is substantially smaller in cross-section than the cross-section of said chamber transverse to the direction of flow, and flow distributor means situated downstream and adjacent from said inlet conduit for directing fluid flow from said inlet conduit upward into said chamber, wherein the improvement comprises:
 means operably associated with said inlet conduit for aiding in the mixing of fluid streams received by said inlet conduit, said flow distributor means located downstream of and proximate said outlet end of said inlet conduit for receiving upward flow from said inlet conduit, means for supporting said flow distributor means in said chamber transverse of the direction of fluid flow from said inlet conduit for a predetermined distance relative to the width of said chamber, said flow distributor means comprising a conically-shaped member having an apex disposed proximate and above said inlet feed conduit, said conically-shaped member extending from its apex in a downstream and outward direction with the sides of said member terminating in spaced relation relative to said chamber wall, whereby said flow distributor means aids in the distribution of fluid uniformly over the transverse cross-section of said chamber.

11. In the chamber of claim 10 wherein said conically-shaped member includes a plurality of circumferentially-spaced ribs extending radially from the apex towards the periphery of said sides for aiding in the flow distribution as the streams exits from said inlet feed conduit and pass towards the periphery of said conical member.

12. In the chamber of claim 10 wherein said conically-shaped member includes a central opening substantially axially aligned with the exit from said inlet feed conduit and a second conically-shaped member located upstream from said primary conically-shaped member extending in the same direction thereas, for aiding in the further distribution of said streams.

13. In an upward flow reactor chamber having a chamber wall and an inlet feed conduit which is substantially smaller in its cross-section than the corresponding cross-section defined by said chamber wall and has inlet and upper outlet ends, said inlet end of said inlet conduit receiving an upward directed fluid stream, flow distributor means situated adjacent and downstream of and above said inlet conduit for directing flow in a general direction from said outlet end of said inlet conduit upward into said chamber, wherein the improvement comprises:
 (a) quench inlet means operably associated with said inlet conduit for injecting a quench liquid stream into said inlet conduit wherein said fluid and quench liquid streams received by said inlet conduit are mixed, said flow distributor means located downstream of and above proximate the outlet end of said inlet conduit, said flow distributor means including at least a main member having a periphery and bottom surface facing said outlet end of said inlet conduit, said main member comprising a substantially curved primary disk-shaped configuration having a plurality of apertures therethrough symmetrically arranged with respect to the axis of said member and said bottom surface comprising a concave configuration facing said outlet end of said inlet feed conduit, said inlet conduit directing upward flow from said outlet end thereof against said bottom surface of said flow distributor means, said concave bottom surface constructed and arranged for cooperation with said upward flow for directing at least a part of said upward flow around the periphery of said main member into a relatively open flow area within said chamber above said main member, means for supporting said flow distributor means including at least said main member in said chamber in transverse fixed relation relative to said chamber wall, said main member extending transversely for a predetermined distance relative to the width of said chamber and having a greater transverse cross-section than the corresponding cross-section of said outlet end of said inlet conduit, said flow distributor means aiding in the distribution of fluid uniformly over the transverse cross-section of said chamber.

14. In the chamber of claim 13 wherein said inlet feed conduit has an outlet end directly adjacent said concave side of said member.